3,297,654
MOULDABLE COPOLYMERS OF MALEIC ANHYDRIDE, ISOBUTYLENE AND A THIRD COMONOMER
Dennis Arthur Barr, Welwyn, and John Brewster Rose, St. Albans, England, assignors to Imperial Chemical Industries Limited, London, England, a corporation of Great Britain
No Drawing. Filed Mar. 29, 1963, Ser. No. 269,193
Claims priority, application Great Britain, Apr. 13, 1962, 14,353/62, June 14, 1962, 22,970/62
8 Claims. (Cl. 260—78)

The present invention relates to a process for the manufacture of new mouldable copolymers from maleic anhydride, isobutylene and at least one other copolymerisable monomer.

Copolymers consisting solely of maleic anhydride and isobutene are found to be generally rigid and strong, and of good surface hardness and may be transparent, water resistant and of high softening point; they have full Vicat softening points generally of the order of 150° C. or more. Thus, they have a set of physical characteristics which would make them attractive moulding materials. However, shaped articles may be moulded or extruded from these copolymers only with difficulty, if at all, because they have very high melt viscosities and can be shaped on conventional equipment only at temperatures of about 260° C. or above, when a substantial degradation of the polymer may occur.

It is an object of the present invention to provide a process for manufacturing copolymers derived from maleic anhydride and isobutylene having lower melt viscosities than maleic anhydride/isobutylene copolymers and for rendering them suitable for moulding at temperatures at which the risk of degradation is reduced. Other objects are to provide such copolymers which retain softening points, rigidity, strength, surface hardness and transparency of the order displayed by maleic anhydride/isobutylene copolymers.

According to the present invention we provide a process which comprises copolymerising maleic anhydride, isobutylene and sufficient of at least one other mono-ethylenically unsaturated monomer to reduce the melt viscosity of the product, in bulk or in the presence of an inert solvent for the monomers and in the presence of a free-radical catalyst to give a copolymer containing at least 25% molar of maleic anhydride and at least 25% molar of isobutylene, separating the polymeric product from the residual liquor of the polymerisation and drying it thoroughly.

THE PROCESS

The polymerisation itself may be effected in bulk or in solution. Polymerisation in aqueous dispersion should not be used as the maleic anhydride would be hydrolysed to the acid at the temperatures normally used for polymerisation. Similarly, therefore, any solvent or bulk polymerisation is preferably also in the absence of any substantial amount of water.

Polymerisation in bulk may require the use of relatively high pressures where the third monomer is a volatile liquid or gas. Also, polymerisation in bulk is generally unsatisfactory below 50° C. because the maleic anhydride is in the solid state while at temperatures where the maleic anhydride is molten, the polymeric products are soluble to some extent in the maleic anhydride and are consequently difficult to separate and purify. Therefore we prefer to effect the polymerisation in a solvent. Solution polymerisation may be effected in any suitable solvent such as a straight chain or cyclic saturated hydrocarbon, an aromatic hydrocarbon, a chlorinated hydrocarbon or an ether, e.g. dioxane. Suitable solvents include n-hexane, cyclohexane, heptane, octane, benzene, toluene, xylene, ethylene dichloride and the like. In some cases, one of the monomers used (for example, styrene) may be a solvent for the other two in which case bulk polymerisation may be simply effected. Certain solvents such as the chlorinated alkanes, e.g. methylene dichloride or chloroform, may act as strong chain transfer agents and give polymers of rather low molecular weight and low softening point so solvents which show little or no chain transfer activity are preferred. Examples are the straight chain alkanes and benzene. It is often useful to operate the process with solvents having low or moderate chain transfer activity when it is desired to control the molecular weight of the product. A suitable solvent for this purpose is toluene.

The polymerisation is effected in the presence of any suitable free radical catalyst, the more common examples of which are the organic compounds containing peroxide groups and azo-compounds. Examples are benzoyl peroxide, acetyl peroxide, butyryl peroxide, lauroyl peroxide, succinoyl peroxide, acetyl cyclohexyl sulphonyl peroxide, ascardiole, peresters such as t-butyl perbenzoate and azo compounds such as $\alpha\alpha'$-azodi-isobutylronitrile. The choice of catalyst will depend mainly upon the temperature of polymerisation. The amount of catalyst used normally ranges from about 0.05% to about 5.0%, based on the weight of monomers, although larger or smaller amounts may be used if desired. However, in general the use of large amounts of catalyst may result in polymers of low molecular weight and, consequently, low softening point.

The choice of temperature for the polymerisation depends to a certain extent upon the molecular weight required in the product, the lower temperature in general giving rise to the higher molecular weight product (all other things being equal). Since a drop in molecular weight may lower the softening point of the polymer and affect its physical properties adversely, it is apparent that the choice of the temperature of polymerisation may affect the softening point of the product. We have found that in general, strong rigid polymers having satisfactory softening points are consistently obtained using polymerisation temperatures of from about 25° C. to about 120° C. although temperatures of from −80° C. to +150° C. may be effective.

Since certain monomers used as third components, such as propylene for example, may act to some extent as chain transfer agents, the choice of the conditions of the polymerisation, such as the solvent (if used), the temperature and catalyst concentration, will depend upon the amount of that monomer present in the polymerisation if products of suitable molecular weight and softening point are to be obtained.

The polymerisation may be effected at atmospheric pressure, at sub-atmospheric pressure or at super-atmospheric pressures if desired.

In a typical polymerisation, the monomeric materials are charged into a vessel containing a solvent, the mixture brought to the desired temperature and the polymerisation initiated by the addition of the free-radical catalyst. The polymerisation is preferably effected in the absence of oxygen, which if present in appreciable quantities may inhibit the reaction. Oxygen may be most easily excluded from the reaction by polymerising under an atmosphere of dry nitrogen or by evacuating the polymerisation vessel before charging the reactants.

On completion of the polymerisation reaction, the separation of the copolymer from the polymerisation liquor may be effected in any suitable manner, such as by boiling off the unreacted monomers and solvent, if any, or by filtration or centrifuging.

Where the polymerisation is effected in the presence of large excesses of isobutylene or is carried to completion in the absence of excess isobutylene, there is generally little or no residual maleic anhydride. However, it is often uneconomical to use larger excesses of the olefine because of the expense of recovering the residue from the polymerisation, and to carry the polymerisation to completion may require an excessively long time. Thus, the mass at the end of the polymerisation frequently contains residual maleic anhydride which is difficult to remove completely by normal separation methods such as those outlined above because it is a solid at room temperature and at elevated temperatures it is a solvent for the copolymer. In addition, the polymerisation medium may contain non-polymeric reaction products of the maleic anhydride with other ingredients of the polymerisation and these by-products may also be difficult to remove from the polymer by such separation methods.

If the copolymers are to be extruded or subjected to other fabrication processes which require the use of an elevated temperatures, it has been found necessary to exclude from them substantially all traces of unreacted maleic anhydride and non-polymeric reaction products of maleic anhydride as the presence of these compounds may be the cause of opacity and bad colour in the copolymers and may increase their water sensitivity. It may also cause undesirable foaming of the copolymers during fabrication.

The maleic anhydride together with its non-polymeric reaction by-products may be removed suitably by washing the polymer after it has been separated from the residual liquor of the polymerisation and in a preferred process according to our invention the polymeric product is washed to remove these materials after it has been separated from the polymerisation liquor.

Any organic liquid which is a solvent for maleic anhydride not for the copolymer may be used for washing the copolymer and examples include aliphatic and aromatic hydrocarbons such as hexane, heptane, octane, benzene, toluene and xylene; chlorinated hydrocarbons such as ethylene dichloride; alcohols such as methanol and ethanol and ethers. The wash may be effected conveniently with warm or hot solvent and it is preferred not to use solvents, such as alcohols and primary and secondary amines, which may react with the anhydride groups of the copolymer under the washing conditions. In particular, their use may cause a reduction in the softening points of the copolymers and may affect the water sensitivity of the products adversely. We prefer to use an ether such as diethyl ether as the wash liquid since its use generally gives polymers of good colour. Alternatively, aromatic hydrocarbons such as benzene may be used as the polymer will swell in them and they may effectively remove substantially all traces of nonpolymeric products. We further prefer that the polymer is washed in a finely divided state in order to ensure as thorough a removal of the maleic anhydride as possible.

After separation of the polymer from the polymerisation liquor (and after washing if this preferred step is used) it is necessary to dry the copolymer thoroughly as the presence of any residual liquor or wash liquid may cause it to foam or degrade during fabrication at elevated temperatures and may also affect the physical properties such as the strength of the copolymer. In addition, where certain compounds such as benzene have been used as the wash liquid, their presence in the copolymer will cause the copolymer to be rejected for many uses on toxicity grounds.

The copolymer may be dried by subjecting it to elevated temperatures in a stream of air or inert gas or by holding it under a vacuum. Where it is proposed to dry it at elevated temperatures in a stream of gas, care should be taken to ensure that it is not subjected to temperatures above its softening point for any length of time because agglomeration may occur and the agglomerated particles may occlude volatile material which then becomes very difficult to remove. We have found, however, that the copolymers may be subjected to temperatures just above their softening points for short periods of time, for example up to about ten minutes, without any adverse effects. A satisfactory alternative method of drying the polymer is to pre-dry it until most of the liquid is removed and then to extrude it in a vacuum extruder. This is a convenient method where it is desired to compact the polymer before subjecting it to further processing. Merely holding the polymer at a moderately elevated temperature for a few hours in still air, such as in an oven for example, is insufficient to effect thorough drying and the products tend to form bubbles or foam during compression moulding or extrusion. In order to obviate the possibility of oxidising the polymer during the drying operation, we prefer to effect it in an inert atmosphere.

We prefer to effect the drying step at an elevated temperature below the softening point of the polymer and in vacuo and the copolymer is preferably in a finely divided state.

Where the product is to be extruded in an extruder without vacuum, rigorous drying should be used, preferably under high vacuum using absolute pressures of the order of 0.5 mm. of mercury or less. Alternatively, where reduced vacuum is used, very long drying periods will normally be required, e.g. of the order of 100 hours or more.

The polymeric product is generally obtained in the form of a fine dry powder substantially free from material that would be volatile at the temperatures of fabrication processes such as moulding or extrusion. They may be very difficult to handle owing to the formation of electrostatic charges upon the surfaces of the powder particles. It is therefore preferred to compact the product before using it in a moulding operation. This may be done in a convenient manner by forming pellets of the product by placing the powder in a container and exerting pressure upon it, optionally with the aid of heat. Alternatively, the powder may be extruded and the extrudate cut into pellets. A vacuum extruder may be used at this stage, as described above, if desired. The powder may be compounded with other ingredients such as stabilizers (e.g., antioxidants and U.V. stabilisers), lubricants, mould release agents and the like at this stage, e.g., by using an extruder with a mixing head.

THE MONOMERS

Copolymers consisting solely of maleic anhydride and isobutylene contain substantially equimolar amounts of each monomer. It is thought that the chains comprise maleic anhydride units alternating with isobutylene units. In general, we have found that any other monomers added to the polymerisation will each tend to replace uniquely either the maleic anhydride or the isobutylene units of the chain although a few third monomers may replace both units.

Without attempting to theorise upon the mechanism of the polymerisation, it may be said as a rule of thumb that if the third monomer contains substituent groups which are notably electron-releasing in character (i.e., they supply electrons to the double bond), then the monomer will copolymerize only in place of some of the isobutylene groups, while if it contains substituent groups notably electron-attracting in character (i.e., attracting electrons away from the double bond), then it will copolymerize only in place of some of the maleic anhydride groups. It will be appreciated that where such a monomer is used as the third constituent in the tercopolymer, it can be present in an amount of not more than 25% molar in our specified tercopolymers.

Examples of monomers with electron-releasing groups are the alkenes, aralkenes and vinyl ethers and examples of monomers with electron-attracting groups are the esters, anhydrides, imides and N-substituted imides of ethylenically unsaturated dicarboxylic acids.

Any mono-ethylenically unsaturated compounds other than the maleic anhydride and isobutylene may be used as the other monoethylenically unsaturated monomers in our process.

While we prefer to use only one further monomer, so forming a tercopolymer, two or more additional monomers may be added if desired.

These monomers may, for example, be ethylene or may have any of the following structures:

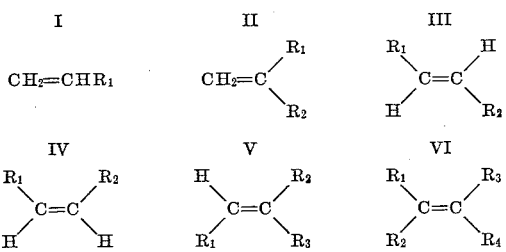

where $R_1$, $R_2$, $R_3$ and $R_4$ are each selected from the class consisting of monovalent hydrocarbon radicals such as alkyl, cycloalkyl, aryl, alkaryl and aralkyl groups, or groups having the structure —COOH, —COOR, —O.CO.H., —O.CO.R., —OR, —CN, —$SO_2$.R, —$SO_3$.R, —CO.R, —$CONH_2$, —CONHR, —$CONR_2$, —$CCl_3$, —CHO, —$NO_2$ or halogen where R is a monovalent hydrocarbon radical. On the other hand, two of $R_1$, $R_2$, $R_3$ and $R_4$ may be conjoined to form a divalent radical such as an alkylene radical to give for example methylene cyclohexane in the case of Structure II or cyclopentene in the case of Structure IV. Other forms of divalent radicals are anhydride groups for example to give substituted maleic anhydrides, itaconic anhydride, citraconic anhydride and the like or imide groups to give for example maleimide and its N-substituted derivatives.

Examples of classes of monomer that may be used are alkenes such as ethylene, propylene, butene-1, 2-methyl-butene-1, pentene-1, 2-methyl pentene-1, hexene-1, heptene-1, octene-1, 2,4,4-trimethyl pentene-1, trimethyl ethylene and methylene cyclohexane; cycloalkenes such as cyclopentene and cyclohexene; aralkenes such as styrene, α-methyl styrene, α-ethyl styrene and other substituted derivatives of styrene; vinyl ethers such as methyl vinyl ether, ethyl vinyl ether, propyl vinyl ether, isopropyl vinyl ether and isobutyl vinyl ether; isopropenyl ethers such as methyl isopropenyl ether; α,β-ethylenically unsaturated carboxylic acids, their esters and nitriles such as methyl acrylate, ethyl acrylate, 2-ethyl hexyl acrylate, acrylonitrile, methyl methacrylate and methacrylonitrile; ethylenically unsaturated dicarboxylic acids, their mono- and di- esters, nitriles, anhydrides and imides such as dimethyl maleate, diethyl maleate, dibutyl maleate, maleic anhydride, maleimide, N-methyl maleimide, N-ethyl maleimide, N-phenyl maleimide, N-p-chlorophenyl maleimide, dimethyl fumarate, diethyl fumarate, dibutyl fumarate, itaconic anhydride, mono-butyl itaconate, citraconic anhydride, mesaconic anhydride and vinylidene cyanide and halogen-substituted alkenes such as vinyl chloride, vinylidene chloride, allyl chloride and methallyl chloride.

It is preferred to use monomers in which the ethylenically unsaturated carbon atoms are not too heavily substituted since ease of polymerisation generally tends to decrease with increase in the number of substituents on the ethylenically unsaturated carbon atoms. Thus, our preferred monomers fall in general into classes having the Structures I, II, III and IV rather than V or VI. However, there may be exceptions to this rule; for example, trimethyl ethylene may copolymerise more readily than butene-2 in our process.

Increase in the length of carbon chain in the monomer generally reduces its ease of polymerisation and therefore we prefer to use compounds having carbon chains not exceeding 6 carbon atoms in length.

We also prefer not to use compounds having bulky substituents on the ethylenically unsaturated carbon atoms since they tend to shield the double bond and inhibit polymerisation, particularly where two such substituents are attached to the same ethylenically unsaturated carbon atom. However, the activating effect that some bulky substituents have on the double bond tends to cancel out their adverse shielding effect. For example, 1,1-diphenyl ethylene is polymerised only with extreme difficulty, whereas vinylidene cyanide may be used with ease.

In order to discuss the effect of the choice of monomer on the properties of the product, we shall deal with each class of monomers in turn.

Where the additional monomer is an alkene, we prefer to use propylene or an alkene containing a chain of not more than 6 carbon atoms and having the Structure II where $R_1$ and $R_2$ are alkyl radicals at least one of which contains more than one carbon atom.

We prefer propylene because of its cheapness, ease of polymerisation with the other monomers and ready availability and because it gives strong copolymers having low melt viscosity and having softening points of the order of 150° C. or higher. However, the addition of large amounts of propylene may affect the water sensitivity of the product to a considerable extent and the copolymers may even become slightly water-soluble. Therefore, we prefer to use not more than 6 mole percent of propylene in the copolymer.

We prefer to use alkenes having a chain of not more than 6 carbon atoms and having the Structure II where $R_1$ and $R_2$ are alkyl radicals at least one of which contains more than one carbon atom because of their ease of polymerisation with the other monomers and because their presence has little or no apparent effect on water sensitivity. They give strong, rigid copolymers having softening points of the order of 150° C. or higher and because of their lack of effect on water-sensitivity they may be used in amounts to give up to 25% molar in the copolymer. Examples of such monomers are 2-methyl butene-1, 2-methyl pentene-1 and 2,4,4-trimethyl pentene-1.

Another suitable alkene is trimethyl ethylene which copolymerises with the other monomers with ease to give copolymers of high softening point.

The aralkenes such as styrene and its substituted derivatives (e.g. α-methyl styrene) give copolymers having little or no water-sensitivity and very high softening point, generally of the order of 170° C. or higher. The products are especially suitable for applications requiring good thermal stability. Tercopolymers containing up to about 10% molar of aralkenes are transparent and of good colour while those containing above about 10% molar tend to be opaque and suffer from a deterioration in physical properties.

The use of lower molecular weight ethers, such as the vinyl ethers of alcohols containing up to three carbon atoms in the copolymerisation tends to give products of undesirably high water-sensitivity and we prefer to use the ethers of alcohols containing from 4 to 6 carbon atoms, particularly vinyl isobutyl ether. Even our preferred ethers may induce water-sensitivity in the products if they are used in large amounts and we prefer, therefore, to obtain products containing not more than about 15% molar of the ether.

The use of certain monomers having electron-attracting groups which will replace the maleic anhydride units in the copolymer chain may lower the softening point of the products substantially and care should be taken to use only small amounts of such compounds. As a general rule, it may be stated that the substitution of maleic anhydride units by units from other monomers having a cyclic structure will not reduce the softening point of the polymer to a large extent, or may even increase it; but the use of substantial quantities of acyclic monomers may reduce the softening point considerably.

Examples of the cyclic monomers are the anhydrides, imides and N-substituted imides of ethylenically unsaturated dicarboxylic acids. Of these we prefer itaconic anhydride and citraconic anhydride because of their ready availability and because they reduce the melt viscosity very effectively, and maleimide and its N-substituted derivatives such as N-methyl maleimide and N-phenyl maleimide because they have little or no effect on the water sensitivities of the product, reduce the melt viscosity effectively, and may even increase the softening point.

Examples of acyclic monomers are esters and nitriles of acrylic and methacrylic acids and mono- and di- esters of ethylenically unsaturated dicarboxylic acids. We prefer the nitriles of acrylic and methacrylic acids, particularly methacrylonitrile, as they have little or no effect on the water sensitivity of the polymers. Where the esters are derived from $\alpha,\beta$-ethylenically unsaturated acids, we prefer those in which the ester groups are in the "trans" positions (i.e. having the Structure III) as they are more easily polymerised. Examples are the fumarates, which have only little effect on the water-sensitivities of the products.

We prefer not to use monomers containing chlorine bound to an aliphatic carbon atom because their tendency to degrade at elevated temperatures reduces the usefulness of the polymers so produced. Where they are used, they should be present in the polymeric products only in small quantities. Examples of such monomers are vinyl chloride, vinylidene chloride, allyl chloride and methallyl chloride.

It has been found that melt viscosities of some of the terpolymers made by our specified process increase with time while others decrease. The observed increases in melt viscosity are thought to be due to crystallisation of the polymer in the melt while any observed decrease is thought to be due to thermal degradation of the polymer. Neither characteristic is desirable in a polymer which is to be used for shaping by extrusion or moulding and we prefer to use those monomer mixtures which give copolymers whose melt viscosities do not change substantially with time. Examples of such mixtures are maleic anhydride and isobutylene with one of 2-methyl butene-1, 2-methyl pentene-1, di-isobutylene, styrene and its substituted derivatives, maleimide and its N-substituted derivatives and small amounts (that is, up to about 6% molar) of propylene.

The copolymers derived solely from maleic anhydride and isobutylene show very high melt viscosities, of the order of about $10^6$ poises at a constant shear stress of $10^7$ dynes/sq. cm. at 250° C., and are therefore difficult both to mould and to extrude. Our copolymers are recognised by the fact that the incorporation of units from at least one other monomer reduces the melt viscosity (in some cases to a substantial extent), and gives a copolymer which has a useful melt viscosity and which is particularly useful for extrusion applications. We prefer our copolymers to contain at least sufficient of the third monomer to reduce the melt viscosity to below $10^5$ poises since then they may be fabricated at temperatures as low as 230° C. or less on standard equipment. Copolymers having melt viscosities above $10^5$ poises at 250° C. may still be fabricated but as their melt viscosity increases so the temperature at which they may be worked also increases with an equivalent increase in the danger of degradation during fabrication, and for copolymers with melt viscosities in excess of $10^5$ poises it is preferred to use compression moulding techniques for producing shaped articles. The amount of monomer required to effect such a reduction in melt viscosity will vary with the choice of monomer and may be found simply by experiment. In general, however, we have found that it is necessary for the copolymer to contain at least 1 mole percent of the third monomer or mixture of monomers.

The ultimate choice of the amount of such a monomer to be used in the copolymer will depend upon its effect on the physical properties of the polymer, particularly softening point and water sensitivity. The effect will vary from monomer to monomer. We prefer our copolymers to have a softening point of at least 150° C.

The products of our process are very useful as thermoplastic materials and those of high molecular weight, that is having a molecular weight corresponding to a reduced viscosity as hereinafter defined of about 0.5 or more, particularly those having a reduced viscosity of above 0.7, are strong, hard and rigid, are often transparent and are especially suitable as moulding materials. They are remarkably useful as materials for hot shaping processes such as extruding, injection and compression moulding and vacuum forming. Therefore, further according to the present invention we provide a process which comprises the steps of heating a high molecular weight copolymer derived from at least 25% molar of maleic anhydride, at least 25% molar of isobutylene and at least one other mono-ethylenically unsaturated monomer, until it attains a thermoplastic state, maintaining the said copolymer in a thermoplastic state while subjecting it to a shaping process and thereafter cooling the copolymer in shaped form.

Reduced viscosities are measured using a 1% weight/volume solution of the polymeric material in dimethyl formamide at 25° C. Reduced viscosity is defined by the equation $$R.V. = \frac{t_1 - t_0}{t_0 \cdot C}$$

where R.V. is the reduced viscosity, $t_0$ is the flow time of the solvent, $t_1$ is the flow time of the solution, C is the concentration of the solution in grams per 100 c.c.

It is preferred not to use copolymers of too high a molecular weight as they may become intractable, and molecular weights equivalent to reduced viscosities of from 0.7 to about 1.0 are very useful although higher molecular weights may also be used in particular applications.

Substantially water-insoluble copolymers having a water sensitivity corresponding to an increase in weight of less than 5% after immersion for 2 hours in boiling water are particularly attractive materials as they may be used for a number of purposes in which they are in a humid atmosphere for long periods.

Moulded products which may usefully be formed from our specified tercopolymers include such items as combs, penholders, handles for instruments, low stressed gears such as are used in small electrical motors and timing devices, rods, tubes, sheets, light fittings, bowls, dishes, telephone handsets, ash-trays, rubbish receptacles, boxes and the like.

Before shaping, the copolymers may be mixed with any of the usual additives such as plasticisers, heat and light stabilisers, mould release agents, lubricants and fillers such as talc, clay, carbon black, powdered metals, mica, asbestos, and glass fibre. The copolymers may also be blended with other polymeric materials, natural or synthetic.

The invention is illustrated by the following examples in which all parts are expressed as parts by weight except where otherwise indicated.

In all the following examples, the physical properties quoted were measured under the conditions set out below.

Melt viscosity: measured at 250° C. and a constant shear stress of $10^7$ dynes/cm.$^2$ Reduced viscosity: measured on a 1% weight/volume solution of the copolymer in dimethyl formamide at 25° C.

Vicat softening point: as described in British Standard Specification No. 2782, Method 1020.

Water sensitivity was measured in 2 ways:

(A) a sheet weighting about 1 gm. and having a thickness of 0.050±0.005 inch was immersed in water at 25° C. for 3 weeks and the change in weight of the sheet was measured at the end of that period and expressed as a percentage alteration in weight.

(B) a sheet having the weight and thickness of that used in test A was immersed in water at 100° C. for periods of 30, 60, 90 and 120 minutes and the percentage change in weight recorded after each immersion.

Flexural strength: measured by supporting a test piece moulded from the polymer at each end and pushing the centre of the piece downwards at a rate of 18 inches/minute as described in "Plastics," vol. 27, July 1962, at page 110.

Energy to break: measured on the same test as that used for flexural strength.

Some of the properties of Examples 1 to 11 are set out in the table following Example 11.

Example 1

This example shows a process according to our invention in which the third monomer is a liquid.

320 parts maleic anhydride (50% molar), 3200 parts toluene and 3.25 parts of acetyl cyclohexyl sulphonyl peroxide were charged into an autoclave which was purged three times with nitrogen at 100 p.s.i.g. and then evacuated to an absolute pressure of about 2 p.s.i., 164 parts of isobutene (45% molar) and 22.7 parts of 2-methyl butene-1 (5% molar) were then added and the mixture stirred at 40° C. for 20 hours to yield a slurry. The slurry was filtered and the solid product extracted with ether and dried under vacuum to give 445 parts (88% yield) of dry terpolymer which could be compression moulded to give clear shaped products of excellent surface finish and good colour.

Example 2

This example shows a process according to our invention in which the third monomer is a solid.

288 parts maleic anhydride (45% molar), 31.5 maleimide (5% molar), 3200 parts toluene and 3.25 parts of acetyl cyclohexyl sulphonyl peroxide were charged into an autoclave which was purged with nitrogen and evacuated as in Example 1. 182 parts isobutene (50% molar) were then added and the mixture stirred for 20 hours at 40° C. to yield a slurry. The slurry was filtered and the solid product extracted with ether and dried under vacuum to give 464 parts (90% yield) of dry terpolymer which could be compression moulded to give clear discs of excellent surface finish and good colour.

Examples 3–5

The process of Example 1 was repeated using in each case instead of the 2-methyl butene-1 5% molar of another third component listed below.

| Ex. No. | Third monomer | Amount used (parts by weight) | Yield of polymer (parts by weight) | Yield percent of theoretical |
|---|---|---|---|---|
| 3 | 2-methyl pentene-1 | 25.9 | 480 | 94 |
| 4 | 2,4,4-trimethyl pentene-1. | 36.4 | 357 | 69 |
| 5 | Vinyl isobutyl ether | 32.5 | 464 | 90 |

Examples 6–8

The process of Example 1 was repeated using 288 parts maleic anhydride (45% molar), 182 parts isobutene (50% molar) and 5% molar of another third component listed below.

| Ex. No. | Third monomer | Amount used (parts by weight) | Yield of polymer (parts by weight) | Yield percent of theoretical |
|---|---|---|---|---|
| 6 | Dibutyl fumarate | 74 | 434 | 80 |
| 7 | Ethyl acrylate | 32.5 | 392 | 78 |
| 8 | Methacrylonitrile | 21.8 | 415 | 84 |

Examples 9–10

The process of Example 2 was repeated using in each case instead of the maleimide 5% molar of another third component listed below.

| Ex. No. | Third monomer | Amount used (parts by weight) | Yield of polymer (parts by weight) | Yield percent of theoretical |
|---|---|---|---|---|
| 9 | Dimethyl fumarate | 46.8 | 416 | 81 |
| 10 | Itaconic anhydride | 37.0 | 470 | 93 |

Example 11

The process of Example 2 was repeated using 120 parts maleic anhydride (37.5% molar), 91 parts isobutene (50% molar) and 58.5 parts dimethyl fumarate (12.5% molar). 1600 parts benzene were used as the solvent and the catalyst was 1.15 parts of benzoyl peroxide. The polymerisation was effected at 75° C. for 20 hours to give a yield of 158 parts (58.5% theoretical) of the tercopolymer.

| Example | 10/10 Vicat Softening Point ° C. | Reduced Viscosity | Melt* Viscosity at 250° C. poises ×10⁴ | Change in Melt Viscosity after 20 minutes | Moulding Temperature, ° C. | Water Sensitivity of Mouldings (change in weight, percent) | | | | | Third Monomer |
|---|---|---|---|---|---|---|---|---|---|---|---|
| | | | | | | A | B | | | | |
| | | | | | | | 30 | 60 | 90 | 120 | |
| | 155 | 0.81 | 100 | Not measured | 260 | +1.08 | +0.29 | +0.43 | +0.54 | +0.60 | Nil. |
| 1 | 149 | 0.79 | 6 | Nil | 240 | +1.08 | +0.36 | +0.52 | +0.66 | +0.69 | 2-methylbutene-1. |
| 2 | 151 | 0.81 | 20 | Nil | 220 | +1.37 | +0.22 | +0.42 | +0.57 | +0.69 | Maleimide. |
| 3 | 150 | 0.90 | 11 | Slight Positive | 240 | +1.02 | +0.37 | +0.50 | +0.63 | +0.68 | 2-methyl pentene-1. |
| 4 | 158 | 0.52 | 3 | Nil | 240 | +1.17 | +0.33 | +0.48 | +0.65 | +0.67 | Di-isobutylene. |
| 5 | 163 | 0.95 | 30 | Positive | 240 | (¹) | +0.28 | +0.51 | +0.60 | +0.77 | Vinyl isobutyl ether. |
| 6 | 163 | 0.74 | (¹) | do | 240 | +0.96 | +0.32 | +0.47 | +0.52 | +0.64 | Di-butyl fumarate. |
| 7 | 156 | 0.82 | 7 | do | 250 | +1.21 | +0.38 | +0.67 | +0.83 | +1.10 | Ethyl acrylate. |
| 8 | (¹) | 0.67 | 20 | do | 240 | +1.02 | +0.19 | +0.34 | +0.46 | +0.55 | Methacrylonitrile. |
| 9 | 154 | 0.54 | 3 | Negative | 220 | (¹) | +0.30 | +0.53 | +0.68 | +0.76 | Dimethyl fumarate. |
| 10 | 149 | 0.78 | 3.5 | do | 240 | +1.16 | +0.31 | +0.49 | +0.55 | +0.71 | Itaconic anhydride. |
| 11 | 150 | 0.49 | 2 | Positive | 240 | (¹) | +0.58 | +0.80 | +1.07 | +1.23 | Dimethyl fumarate. |

¹ Not measured.
*By way of comparison the melt viscosity of a copolymer of maleic anhydride and isobutylene having a reduced viscosity of 0.76 is 100×10⁴.

Examples 12–15

Using the process of Example 1 a number of polymerisations were effected using maleic anhydride (50% molar) and various proportions of isobutylene and propylene. The properties of the polymers are set out below. Where there are gaps in the table, it means that the properties were not measured.

| Example No | 12 | 13 | 14 | 15 |
|---|---|---|---|---|
| Amount of propylene in copolymer [1] (mol. percent) | 0 | 2 | 4 | 10 |
| Reduced Viscosity | 0.81 | 0.96 | 0.71 | 0.70 |
| Melt Viscosity (poises) at 250° C | 100×10$^4$ | | 55 | |
| Water sensitivity after 120 mins. in boiling water | +0.6 | +0.69 | +1.35 | [2] −1.4 |
| Vicat softening point | 155 | | 151 | 156 |
| Flexural strength (lb./sq. in.) | 12,900 | | 16,000 | 17,000 |
| Energy to break (ft. lb./cu. in.) | 12 | | 12 | 17 |
| Hardness: Rockwell Scale M | 112 | | | 109 |

[1] Calculated by infra-red analysis from the ratio of the strength of the deformation band due to the single methyl group of the propylene at about 7.2 to 7.3μ to the strength of the deformation bands due to the double methyl groups of the isobutylene at about 7.2 to 7.3μ.

[2] This negative value is thought to be due to the polymer or its hydrated derivatives dissolving in water.

*Example 16*

In this example, an excess of olefin was used based on the maleic anhydride. The process of Example 1 was repeated using 440 parts (4.5 moles) of maleic anhydride, 336 parts (6 moles) of isobutylene and 84 parts (1.5 moles) of propylene. 4 parts of azo-di-isobutyronitrile were used as catalyst and the polymerisation was effected at 80° C. for 20 hours in 3200 parts of toluene.

The product was separated from the residual monomer by filtration, washed with ether and dried in the finely divided state for 16–20 hours at 85° C. and an absolute pressure of 15 mm. Hg followed by 50 hours at 100° C. and 0.1 mm. of Hg to give 772 parts of a tercopolymer having a reduced viscosity of 0.8 and a melt viscosity of 5.0×10$^4$ poises. It gained only 0.5% by weight after immersion for 2 hours in boiling water. By comparison a copolymer of maleic anhydride and isobutylene having a similar reduced viscosity had a melt viscosity, measured under the same conditions, of about 100×10$^4$ poises and could be moulded only with considerable difficulty at 260° C.

The polymer was in the form of a dry powder which could be extruded to give a clear bubble-free extrudate or compression moulded to give clear shaped products of good colour, finish and strength.

*Example 17*

58.7 parts of maleic anhydride, 23.5 parts of isobutylene and 15.1 parts of 2-methyl pentene-1 were polymerised by the process described in Example 1 using 0.59 part of azo-di-isobutyronitrile as catalyst and 520 parts of toluene as solvent. The polymerisation was effected at 60° C. for 6 hours and thereafter the product was filtered, washed with ether and dried in the finely divided state for 16–20 hours at 85° C. and an absolute pressure of 15 mm. Hg followed by 72 hours at 100° C. and 0.3 mm. of Hg to give 61 parts of a dry powder which could be extruded to give a bubble-free extrudate or compression moulded at 230° C. to give clear, strain-free shaped products of good colour and finish, having little or no water sensitivity.

The reduced viscosity of the tercopolymer was 0.80 and it was still amorphous after annealing from 230° C. at a drop in temperature of 6° C. per hour. Its flexural strength was about 15,000 lb./sq. in. and its melt viscosity was 0.5×10$^4$ poises at 250° C. By comparison, the melt viscosity of a copolymer of maleic anhydride and isobutylene having a reduced viscosity of 0.81 is 100×10$^4$.

*Example 18*

The polymerisation of Example 1 was repeated using 353 parts of maleic anhydride, 182 parts of isobutylene and 37.5 parts of styrene. 3.5 parts of azo-di-isobutyronitrile were used as catalyst and 3120 parts of toluene as solvent. The polymerisation was effected at 70° C. for 11 hours and the product was separated, washed with ether and dried by holding it in a blast of nitrogen at 100° C. in the finely divided state for 72 hours followed by a period at 100° C. under absolute pressure of 0.1 mm. of Hg for 50 hours. 505 parts of a clear tercopolymer having a reduced viscosity of 0.53 were obtained. The polymer was amorphous after annealing from 230° C. at a cooling rate of 6° C. per hour, had a flexural strength of about 10,000 lb./sq. in. and a melt viscosity of 15×10$^4$ poises. It was found to contain 7% molar of styrene by infra-red analysis. Its full Vicat softening point was about 170° C.

*Example 19*

Three tercopolymers were prepared and after separation from the polymerisation liquor, each product was divided into two portions. The first portion was washed with methanol and the second portion was washed with benzene. After washing, both parts were subjected to the same rigorous drying step and the water sensitivities of the products compared. The water sensitivity was measured as the percent gain in weight of the copolymer after immersion for 2 hours in boiling water.

| Third monomer in tercopolymer | Wash liquid | Water sensitivity after 120 mins. in boiling water |
|---|---|---|
| Styrene | Methanol | +0.9 |
| | Benzene | +0.65 |
| Ethylacrylate | Methanol | +2.8 |
| | Benzene | +1.01 |
| Propylene (8% molar) | Methanol | +33.0 |
| | Benzene | +2.38 |

It will be seen that washing the products with methanol causes a considerable and undesirable increase in their water sensitivities.

We claim:

1. An injection moldable copolymer of maleic anhydride, isobutylene and about 1% molar to about 25% molar of a third comonomer selected from the group consisting of (i) alkenes having a chain of not more than six carbon atoms and having the structure

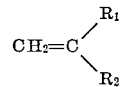

where $R_1$ and $R_2$ are both alkyl groups, at least one of which contains more than one carbon atom, (ii) cyclic anhydrides, imides and N-substituted imides of ethylenically unsaturated dicarboxylic acids containing not more than 6 carbon atoms, other than maleic anhydride, (iii) dialkyl fumarates of the structure

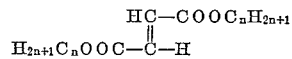

where $n$ is one or four, (iv) ethyl acrylate and (v) propylene; said copolymer containing at least 25% molar of maleic anhydride, at least 25% molar of isobutylene and not more than 6% molar of propylene, and wherein the melt viscosity of the copolymer is below 10$^5$ poises, measured at 250° C. under a constant shear stress of $10^7$ dynes/cm.$^2$, whereby the copolymer may be fabricated at temperatures as low as 230° C. or less on standard equipment.

2. A copolymer according to claim 1 having a reduced viscosity of from 0.7 to 1.0, measured at 25° C. as a solution in dimethyl formamide containing one gram of copolymer in 100 millilitres of the solution.

3. A copolymer according to claim 1 in which the third comonomer is 2-methyl butene-1.

4. A copolymer according to claim 1 in which the third comonomer is 2-methyl pentene-1.

5. A copolymer according to claim 1 in which the third comonomer is 2,4,4-trimethyl pentene-1.

6. A copolymer according to claim 1 in which the third comonomer is itaconic anhydride.

7. A copolymer according to claim 1 in which the third comonomer is selected from the group consisting of maleimide and N-substituted derivatives thereof.

8. A copolymer according to claim 1 having a full Vicat softening point of at least 150° C.

References Cited by the Examiner

UNITED STATES PATENTS

| | | | |
|---|---|---|---|
| 2,378,629 | 6/1945 | Handord | 260—78.5 |
| 2,698,316 | 12/1954 | Giammaria | 260—78 |
| 2,725,367 | 11/1955 | Niederhauser | 260—78.5 |
| 3,053,814 | 9/1962 | Hedrick | 260—78 |
| 3,157,595 | 11/1964 | Johnson et al. | 260—78 |

WILLIAM H. SHORT, *Primary Examiner.*

H. D. ANDERSON, *Assistant Examiner.*